United States Patent [19]

Le Guen et al.

[11] 4,133,601
[45] Jan. 9, 1979

[54] OPTICAL FIBERS BUNDLE POSITIONING FERRULE

[75] Inventors: Benoit Le Guen; André Jacques, both of Paris, France

[73] Assignee: Thomson-CSF, Paris, France

[21] Appl. No.: 744,024

[22] Filed: Nov. 22, 1976

Related U.S. Application Data

[63] Continuation-in-part of Ser. No. 672,602, Apr. 1, 1976, abandoned.

[30] Foreign Application Priority Data

Nov. 21, 1975 [FR] France ................ 75 35651

[51] Int. Cl.² .................................................. G02B 5/14
[52] U.S. Cl. .............................. 350/96.21; 350/96.22
[58] Field of Search ................ 350/96 C, 96 B, 96 R, 350/96.20, 96.21, 96.22

[56] References Cited

U.S. PATENT DOCUMENTS

| | | | |
|---|---|---|---|
| 3,734,594 | 5/1973 | Trambarulo | 350/96 B |
| 3,846,010 | 11/1974 | Love et al. | 350/96 C X |
| 3,861,781 | 1/1975 | Hasegawa et al. | 350/96 C |
| 3,969,015 | 7/1976 | Le Noane | 350/96 C |
| 4,009,931 | 3/1977 | Malsby et al. | 350/96 C |

FOREIGN PATENT DOCUMENTS 2524846  12/1975  Fed. Rep. of Germany ........ 350/96 C

*Primary Examiner*—John K. Corbin
*Assistant Examiner*—John D. Lee
*Attorney, Agent, or Firm*—Cushman, Darby & Cushman

[57] ABSTRACT

A positioning terminal for an optical fibre or a bundle of optical fibres in which the position of the fibre or bundle is defined relatively to a right circular cylindrical external surface. The centering of the fiber or bundle of the axis of the external surface is achieved by compressing a deformable internal cylindrical body arranged in a coaxial hole and traversed by the fibre or bundle through an axial bore. In the case of a bundle, a compact hexagonal arrangement of the individual fibres ends is thus obtained, and by giving to the coaxial hole an hexagonal cross section, the orientation of the hexagonal arrangement can be marked on the terminal external surface. Methods for manufacturing such a terminal and for arranging it at the end of a fibre or bundle are also described.

18 Claims, 8 Drawing Figures

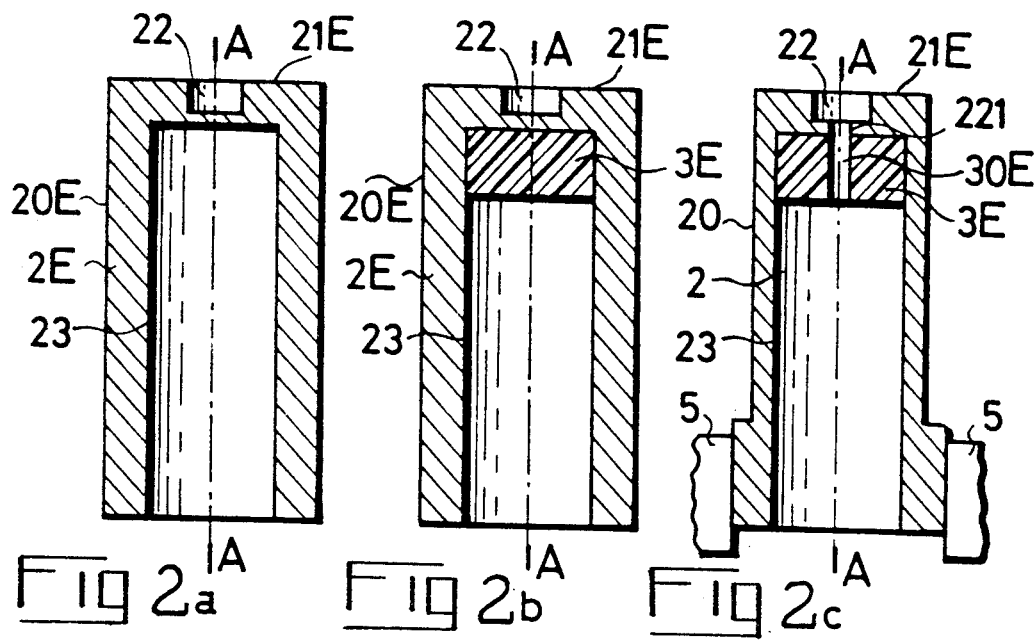
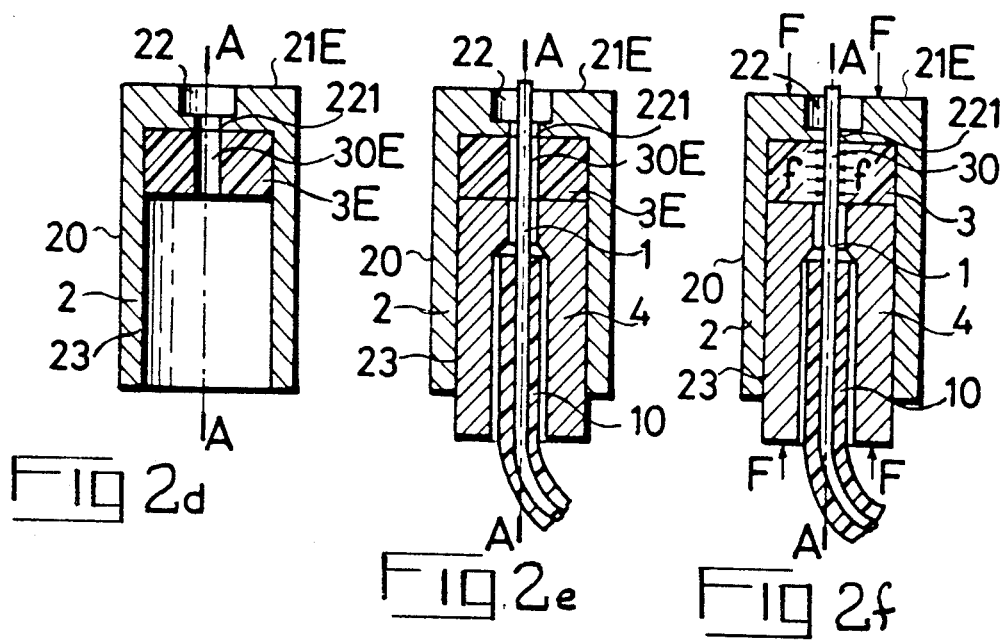

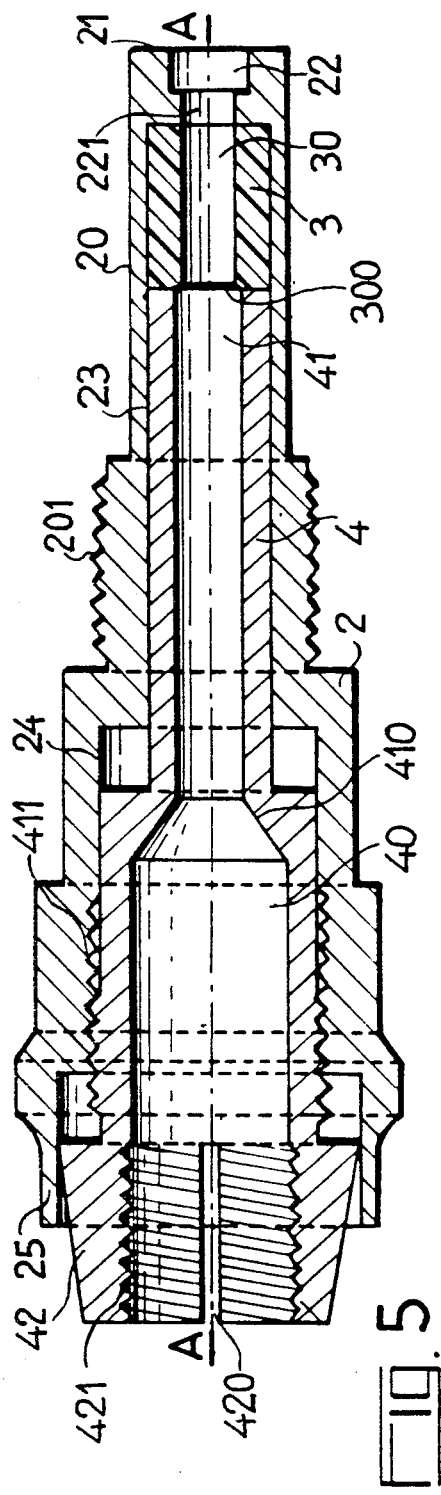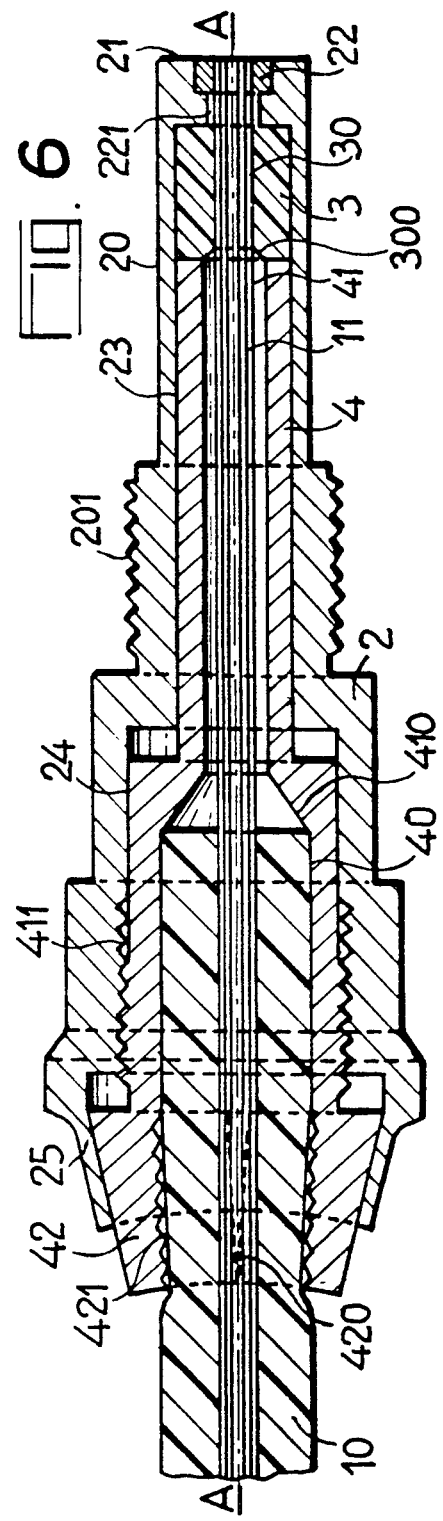

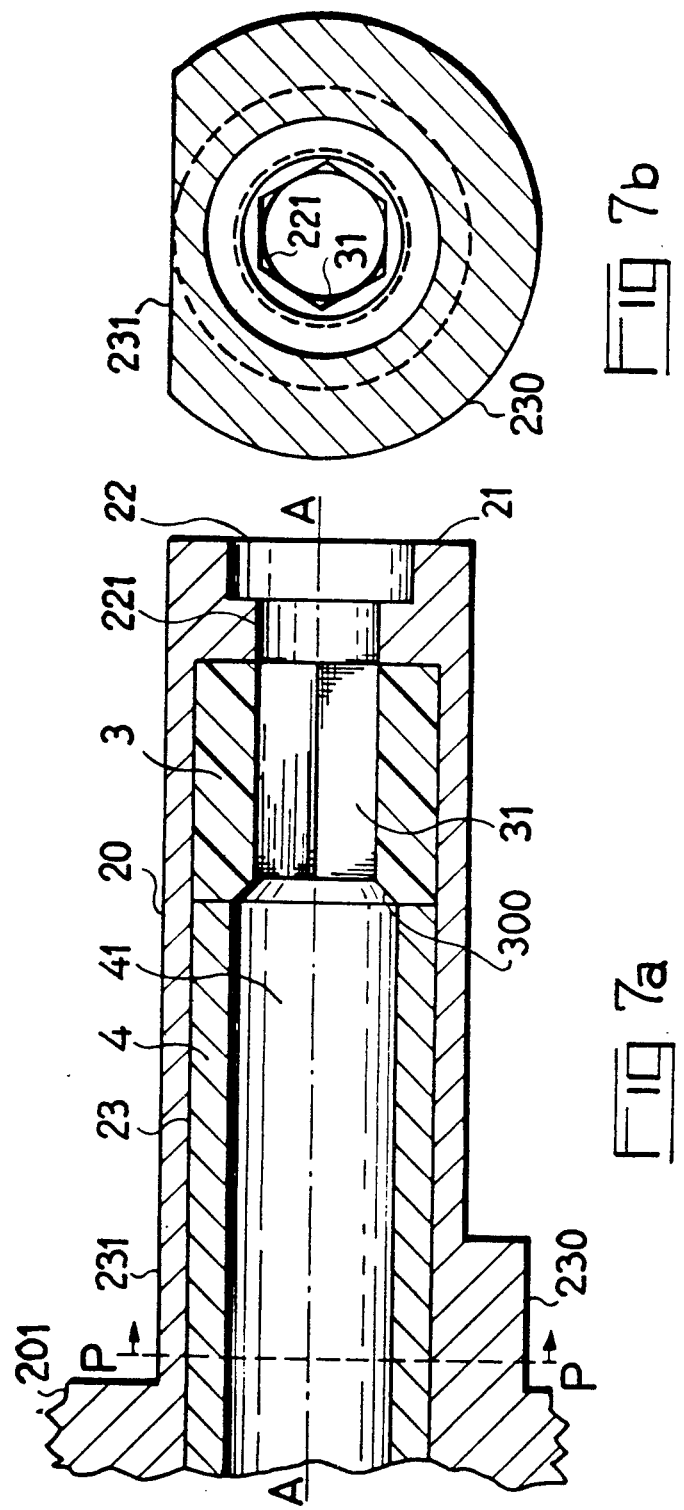

OPTICAL FIBERS BUNDLE POSITIONING FERRULE

This is a Continuation In Part application of the Parent Patent Ser. No. 672,602 filed Apr. 1, 1976, now abandoned.

FIELD OF THE INVENTION

The invention relates to a terminal for a single optical fibre or a bundle of optical fibres and to the method by which this terminal is made.

BACKGROUND OF THE INVENTION

It is known that an optical fibre is a dielectric structure, generally cylindrical in shape with a circular crossection, which is intended to convey a luminous wave and which is formed by two coaxial media: a central medium with a high refractive index known as the "core" and a peripheral medium known as the "cladding". The diameter of the core varies between a few microns and about 100 microns, depending upon the type of propagation adopted in the fibre. In cases where optical fibres are used in optical telecommunications, it is often considered preferable, in order to increase mechanical flexibility and to guard against the dangers of breakages, to replace a single fibre by an assemblage or "bundle" of identical fibres a few tens of microns in diameter, so that all the fibres of one and the same bundle convey the same information. In very general terms, these bundles comprise a number N of fibres: 7, 19, 37 . . . corresponding to the general formula $N = 1 + 3n(n - 1)$, so as to enable the fibres to be assembled in the form of a regular hexagon. The fibre or the bundle are disposed in a "protective sheath", generally made of a flexible plastics material.

In order to obtain a detachable connector between a single fibre or a bundle of fibres and either a transmitter or a receiver or a single fibre or another bundle of fibres, it is essential to gather the ends of the fibres, which are extremely fragile, in a terminal which affords them mechanical protection and which is intended to form part of an optical connector that enables the bundle of fibres to be rapidly plugged in and unplugged. In order to minimise the luminous losses caused by the connection, this terminal has to satisfy various requirements. In particular:

it has to centre the fibre or the bundle of fibres with maximum precision so that the positioning of the terminal relative to the connecting member of the element to be connected enables the bundle to be positioned ipsofacto relative to the element;

in the case of a bundle, it has to gather the ends of the fibres into as compact an assemblage as possible so as to reduce the interstices between fibres and hence to increase the ratio between the useful surface area and the total surface area of the orifice of the bundle.

In addition, when the detachable connector is used for assembling two bundles of identical fibres together, it is desirable that the two terminals be designed in such a way that they enable the orifices of each of the fibres to be automatically disposed opposite one another, because a direct coupling device such as this is more efficient than indirect coupling devices, such as lenses or single mixing fibres, where that part of the luminous flux which impinges in the interstices between fibres of the receiving bundle is inevitably lost.

SUMMARY OF THE INVENTION

According to the present invention, a terminal for a single optical fibre or for a bundle of optical fibres is formed by a cylindrical outer element of circular crossection comprising a coaxial cavity of the same shape into which a disc of a readily deformable material is inserted. The end of the terminal and the disc are initially bored to a diameter larger than that of the fibre or the bundle free of their protective sheath. Following introduction of the fibre or the bundle into the terminal, a plunger introduced into the coaxial cavity deforms the disc by compression so that it closely surrounds the circumference of the fibre or bundle. Providing the boring of the disc is strictly coaxial with the cylinder forming the periphery of the outer element this property is retained during deformation of the disc and the fibre or bundle is thus automatically centred in the terminal.

The great advantage of this terminal, when it is used for a bundle of fibres, is that not only does it condense the ends of the fibres into an arrangement very similar to the compact hexagonal assemblage, which affords maximum compactness, but also the periphery of the bundle thus assembled assumes the form of a quasi-perfect hexagon. It is thus possible to utilise this property to form a detachable connector which enables the individual fibres of the connected bundles to be disposed end-to-end without having to resort to trial and errors.

In addition to the advantages referred to above, namely automatic centring of the fibre or bundle relative to the periphery of the terminal and gathering of the end of the bundle into a compact hexagonal assemblage, the terminal according to the invention has the advantage that, since the disc and the end of the terminal are bored to a diameter distinctly larger than that of the fibre or bundle, introduction of the fibre or bundle into the terminal is greatly facilitated. In addition, the holding of the assemblage of fibres by the compressed disc is sufficient to render the terminal integral with the bundle irrespective of any subsequent bonding.

BRIEF DESCRIPTION OF THE DRAWING

This invention, together with its features, advantages and objects, can be better understood from the following detailed description when read in conjunction with the attached drawings, in which:

FIGS. 2a to 2f show the various stages involved according to the invention in the production of the terminal illustrated in FIG. 1 and its mounting on a fibre.

FIGS. 5 and 6 are two sectional views of a second embodiment of the terminal according to the invention before and after fitting to a bundle of fibres.

FIGS. 7a and 7b are two sectional views through the front part of the second embodiment of the terminal according to the invention shown in FIGS. 5 and 6, modified to allow the marking of a direction characteristic of the compact assemblage.

DETAILED DESCRIPTION OF A FIRST EMBODIMENT

Figure 1:
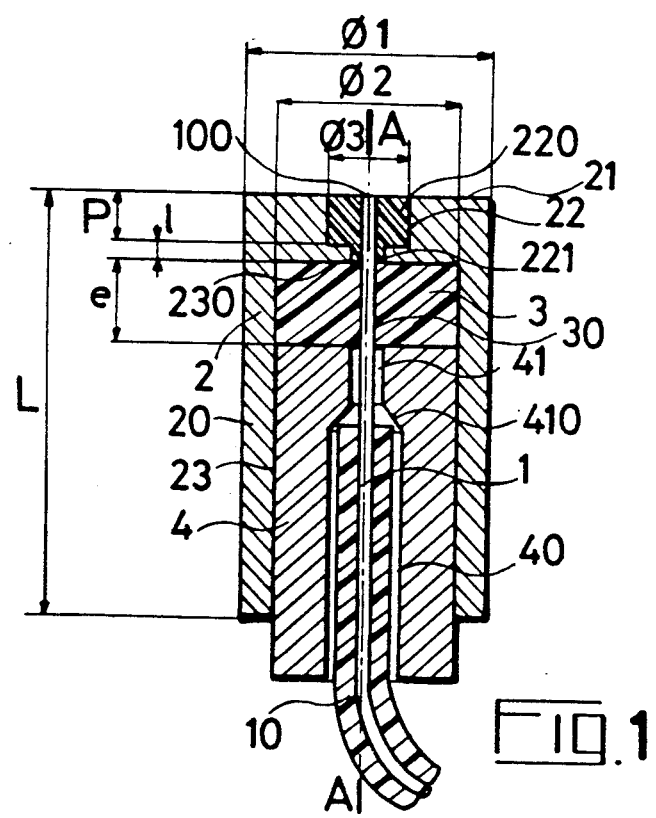
FIG. 1 shows a first embodiment of the terminal according to the invention disposed at the end of a single fibre.

FIG. 1 relates to a simplified embodiment of the terminal according to the invention, shown in a sectional view through its axis, such as it appears after fitting to the end of a single optical fiber 1 provided with its protective sheath 10.

The terminal proper comprises an outer part, or external body 2 inside which are arranged a disc or internal body 3 and a plunger 4.

The outer part 2 is a metallic component in the form of a cylinder 20 of circular cross-section along the axis AA. It terminates in a flat surface 21 perpendicular to the axis AA. A cylindrical recess 22 is formed in the front of the surface 21, again along the axis AA. The fibre 1 free of its protective sheath 10 opens into this cylindrical recess 22. That part of the recess 22 which is not occupied by the fibre 1 is filled with a resin which may be an epoxy resin derived from diphenol A and epichlorhydrin, known under the commercial trade mark "Araldite". The orifice 100 of the fibre 1, the outer part of the resin occupying the recess 22 and the front surface 21 of the outer part 2 form a single plane having an optical polish. The centre of the exit orifice 100 of the fibre is substantially situated on the axis AA of the outer part 2. The base of the recess 22 is drilled with an axial hole 221 for the passage of the fibre 1.

The interior of the outer part 2 forms a cylindrical cavity 23 which is also of circular cross-section along the axis AA and which, towards the front, is defined by a flat surface 230 parallel to the surface 21. The bottom of this cavity is filled by the disc 3 which closely follows its contour and which, by rigidly holding the non-sheathed part of the optical fibre along the axial hole 30, ensures that it is strictly positioned along the axis of the outer part 2. This disc 3 is machined from a material which undergoes significant permanent deformation when subjected to compression. The coefficient of deformation by volume of this material should be considerably higher than that of the material forming the outer part. Polymerised materials, such as polytetrafluorethylene, marketed under the registered trade mark "Teflon", or polyamino-11-undecanoic acid, marketed under the registered trade mark "Rilsan", are particularly suitable materials for the disc. However, it is also possible to use metals or alloys, for example indium, lead or tin-lead alloys. A metal plunger 4 rests on the disc 3. If possible, this plunger 4 is made of the same material as the outer part 2; it fits into the cavity 23 from which it slightly projects. The axis of this plunger, coincident with the axis AA, comprises two successive bores 40 and 41 which are separated by a conical shoulder 410. The diameter of the first bore 40 is slightly greater than the diameter of the fibre provided with its protective sheath. The fibre is unsheathed at the level of the shoulder 410, the protective sheath of the fibre abutting against this shoulder. The diameter of the second bore 41 is slightly greater than that of the bare fibre and allows it through. The plunger 4 is fixed to the walls of the cavity 23 by a varnish. The protective sheath 10 of the fibre is similarly held in the recess 40.

FIGS. 2a through 2f show the principle stages involved in the production of this terminal and in the anchoring of the fibre therein.

As can be seen from FIG. 2a, the first stage of the manufacturing process comprises lathe-turning the blank 2E of the outer part 2 shown in FIG. 1. The outer lateral surface 20E of this blank 2E is a cylinder of circular cross-section with a diameter and length greater than those of the final outer part. The blank 2E terminates in a flat front surface 21E in which is formed the cylindrical recess 22 bored to its final diameter.

In a second stage, as also shown in FIG. 2a, the cavity 23 is bored to its final diameter. FIG. 2a shows the blank at the end of this second stage.

FIG. 2b shows the blank at the end of the third stage, which comprises force-fitting in the cavity 23 the inner part 3E which, after boring, will form the disc 3 shown in FIG. 2.

In a fourth stage, the coaxial orifices 221 in the front surface 21E and 30E in the inner part 3E are drilled in one and the same operation. The two orifices are slightly larger in diameter than the bare fibre 1 so that the bare fibre 1 is able to slide freely in them.

In a fifth stage, the outer lateral surface 20E is lathe-turned to its final shape to form the outer surface 20. FIG. 2c shows the workpiece at the end of this fifth stage. The drilling operation of the fourth stage and the lathe-turning operation of the fifth stage are carried out with the workpiece held on the lathe by means of clamping jaws 5. This precaution makes it possible to obtain excellent coincidence between the axis of the cylinder forming the circumference 20 and the axis of the orifices 221 and 30E.

The sixth stage comprises separating the front section of the outer part from the rear section held between the jaws of the lathe. As shown in FIG. 2d, the outer part is thus obtained in its final dimensions provided with the disc 3E bored with the orifice 30E.

During a seventh stage, the plunger 4 turned to its final size is introduced into the cavity 23. FIG. 2e shows the terminal at the end of this stage when it is ready to be fitted to a fibre or bundle. This same FIG. 2e shows a single fibre 1 prepared to receive the terminal. The fibre, after having been freed of its protective sheath 10 has been introduced into the plunger 4 so that the orifice of the fibre is situated in front of the plane 21 E defining the front surface of the outer part 2.

FIG. 2f shows the initial stage in the anchoring of the terminal to the fibre. During this stage, a force F is applied to the plunger which thus applies a pressure to the disc 3E. Under the effect of the compression which it undergoes, the yieldable disc is concentrically deformed in the direction of the arrows f in FIG. 2f and holds the optical fibre 1. The orifice 30E bored through the disc then assumes its final size corresponding to the reference 30. The important aspect of this operation is that, since the material and the compression are isotropie, the precision of concentricity obtained during turning of the assembly as a whole during the third stage is retained over the entire held length of fibre 1 which is thus very accurately disposed coaxially of the cylinder forming the outer circumference 20 of the outer part 2. The force F applied to the plunger, the period for which this force is applied and the temperature at which the operation is carried out are essentially dependent upon the type of material of which the disc 3 is made. For example, if the disc 3 is machined from "Teflon", the terminal is heated at 100° C. for 10 to 15 minutes during application of the force F, the pressure being relaxed at the end of this period of time in order to stop flow.

The second stage in the anchoring of the terminal to the fibre comprises filling the recess 22 with resin, while the third stage comprises polymerising the resin. Particularly satisfactory results have been obtained by using a quicksetting Araldite "PROCHAL", type AW 127, mixed in equal proportions with a hardener of the same Mark, type HW 2957. Assuming the disc to be made of "Teflon", flow takes place at 100° C., while filling of the resin takes place when the force applied to the plunger is relaxed. The assembly as a whole is kept at 100° C. for about 10 to 15 minutes which is sufficient to obtain correct polymerization of the resin at that temperature.

The fourth stage of the anchoring process comprises fixing the plunger 4 in the cavity 23 and the cladding 10 in the cavity 40 by depositing on the free rear ends of these elements a drop of a varnish which penetrates into the interstices by capilliary action and ultimately holds these elements in place.

The fifth and last stage of the anchoring process comprises polishing the front surface 21E, i.e. providing this surface with an optical polish to bring the orifice 100 of the fibre, the outer surface 220 of the resin and the front surface 21 of the outer part 2 into a single plane. This operation is carried out by removing approximately 100 $\mu m$ of metal. The final terminal such as illustrated in FIG. 1 is thus obtained.

Still by way of non-limiting example, a terminal was produced by the method described above to fit a fibre of 61 $\mu m$ in diameter with the following principal parameters (corresponding to the notations of FIG. 1):

outer diameter of the outer part 2 : $\phi 1 = 4.0$ mm
length of the outer part 2 : $L = 7.0$ mm
diameter of the plunger 4 : $\phi 2 = 3.0$ mm
thickness of the disc 3 : $e = 1.5$ mm
diameter of the recess 22 : $\phi 3 = 0.5$ mm
depth of the recess 22 : $p = 1.0$ mm
length of the orifice 221 : $l = 0.5$ mm The outer part 2 and the plunger 4 are made of brass and the disc 3 of "Teflon".

By machining the terminal with a precision lathe of standard quality and with ordinary tools, the precision of concentricity between the axis of the fibre and the axis of the cylinder forming the circumference of the terminal was still found to be better than 4 $\mu m$. With a high precision lathe and suitable tools, it is possible to define the centring to better than 2 $\mu m$.

Figure 3:
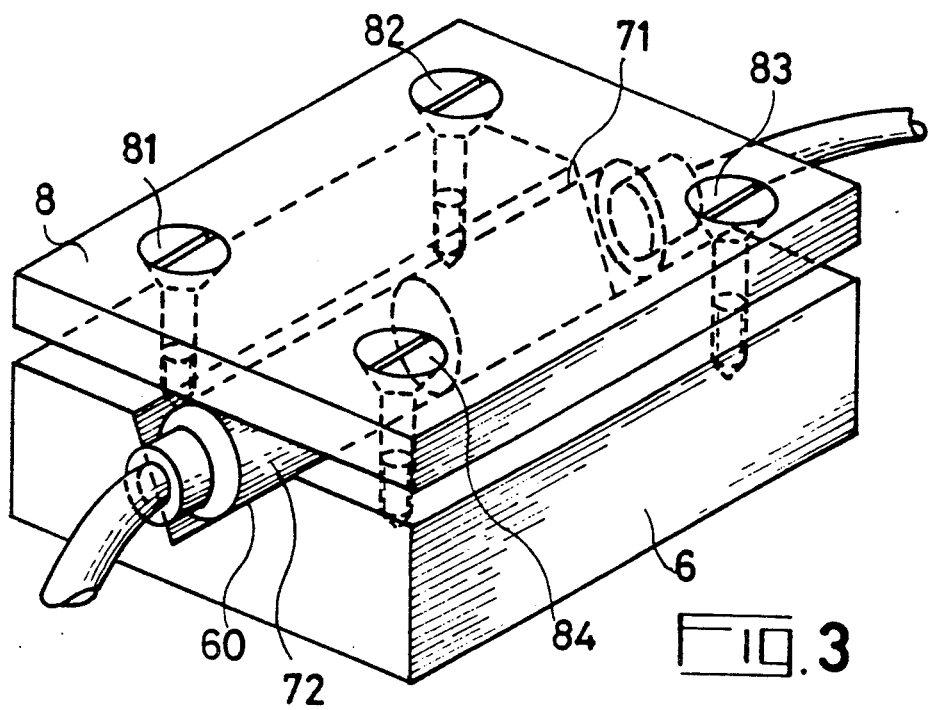
FIG. 3 shows a connector using two identical terminals according to the invention as illustrated in FIG. 1.

FIG. 3 shows an apparatus enabling two terminals of the type described above to be coupled to connect two single optical fibres to one another. A connector of this type comprises a base 6 formed with a V-shaped groove 60 into which the two terminals 71 and 72 joined at their front surface are introduced. The depth of the groove is such that the terminals align with one another slightly above the plane of the base in which the groove is formed. A thin plate 8, held in place by four screws 81, 82, 83 and 84 driven into the base applies a slight pressure to the two terminals to hold them in position. Since the terminals according to the invention provide for quasi-perfect centring of the fibre relative to the cylinder forming the outer circumference, it is sufficient for the groove and the outer peripheries to be formed with the required precision to obtain positioning with respect to the two fibres to be connected.

DETAILED DESCRIPTION OF A SECOND EMBODIMENT

FIGS. 4 to 8 relate to a more sophisticated embodiment of the terminal according to the invention, which terminal is designed as the male component of a plug-in connector. Though such a terminal could also equip a single fibre, FIG. 6 shows it fitting a bundle of fibres, and FIGS. 7a and 7b relate to a modified version specially designed to equip bundles of fibres.

Figure 4:
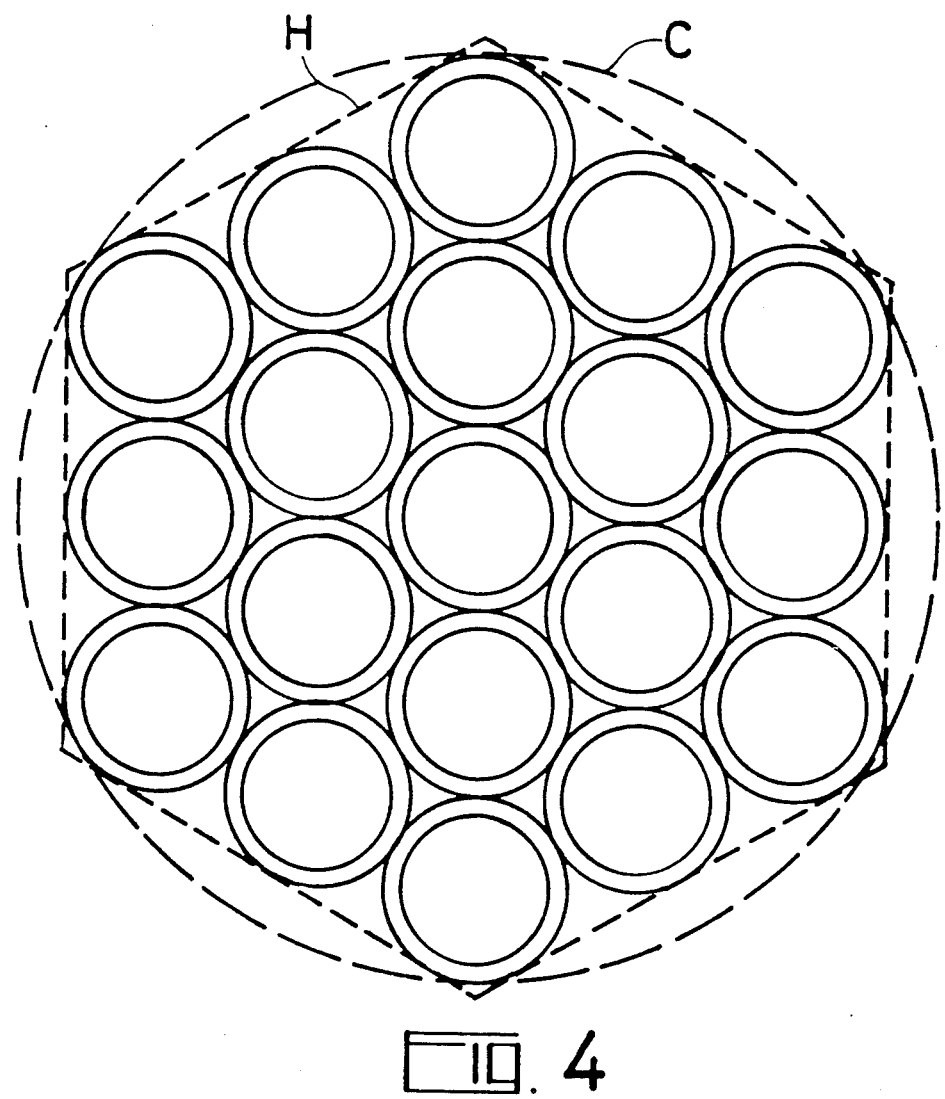
FIG. 4 is a section through a bundle of fibres in the form of a compact hexagonal assemblage according to the prior art.

FIG. 4 is a section through a bundle of fibres in the form of a compact hexagonal assemblage which is the type of assemblage obtainable with the terminal according to the invention.

It is known that an arrangement of this type is the most compact which it is possible to obtain with fibres of circular cross-section. When, as is the case with the bundle shown in FIG. 4, the number N of fibres of the bundle is determined by the relation : $N = 1 + 3n (n - 1)$ in the present case n = 3 and N = 19), the fibres may be assembled in the form of a regular hexagon H of which the apothem a is determined by the relation $a = r[1 + (n-1)\sqrt{3}]$, where 2r is the diameter of the fibres. Accordingly, the bundle may be inscribed in a circle C of radius $R = (2n-1) r$.

FIGS. 5 and 6 show the second embodiment of the terminal in a sectional view along its axis, respectively before and after it has been fitted to a bundle of fibres. In these two Figures, the same elements are denoted by the same reference numerals.

As shown in FIG. 5, this embodiment of the terminal, like the simplified version shown in FIGS. 1 and 2e, consists essentially of three separate parts, all three being bodies of revolution about an axis AA : an outer part or external body 2, a deformable disc or internal body 3 and a plunger 4.

The outer part 2 comprises a cylindrical peripheral element 20 of circular cross-section which forms the positioning mark of the terminal and which is intended to fit into a female part of the connecting element. A screwthread 201 enables a fixing element to be screwed on during the connection. The front surface 21 comprises a cylindrical orifice 221 for the passage of the bundle of fibres. The cylindrical surface 20 and the orifice 221 are designed to have strictly the same axis AA. The diameter of the circle circumscribes the bundle in its compact hexagonal arrangement. A recess 22 formed around the orifice 221 is intended to receive a polymerisable resin of which the function during positioning of the bundle will be explained hereinafter. At the rear of the outer part 2 there is a thin deformable element 25 which is intended to enable the terminal to be crimped onto the plunger 4. The outer part is formed internally with a cylindrical cavity in two parts 23 and 24 of which at least the part 23 is by design strictly coaxial with the surface 20. The outer part is made of a substantially unbreakable material, for example a lead brass, such as the brass U Z 39 Pb 3 to enable the rear part 25 to undergo the crimping operation without any risk of breakage.

The disc 3 is disposed in the front part of the cavity 23 and conforms closely to the base thereof. It is made of a material which is capable of undergoing, by compression, significant temporary or permanent deformation. The coefficient of deformation by volume of this material should be very much higher than that of the constituent material of the outer part. It comprises an orifice 30 of circular cross-section which has the same diameter as and is strictly coaxial with the orifice 221 and which is provided on its rear part with a chamfer 300 to facilitate introduction of the bundle of fibres.

The plunger 4 is made of a hard metal, for example a brass of conventional type. It is formed by a body of revolution about the axis AA and is designed to slide freely in the parts 23 and 24 of the cavity formed in the outer section 1. It comprises two bores 40 and 41 which are aligned with the axis AA and which are larger in diameter than the bundle of fibres respectively provided with and free of its protective sheath. These two bores communicate through a conical part 410 which facilitates introduction of the sheath-free bundle from the part 40 into the part 41. At its rear end, the plunger 4 terminates in a frusto-conical part 42 formed with four slots parallel to the axis which divide it into four quadrants. Of these four slots, only the slot 420 is visible in the Figure. In the vicinity of this frustoconical part, the bore 40 comprises indentations 421 which may be formed by a screwthread. The frusto-conical part 42 as a whole forms a clamp which, by virtue of the play allowed by the slots, surrounds the protective sheath of the bundle during the crimping operation under the action of the deformable part 25.

In one particular version of this second embodiment a screwthread 411 enables the plunger 4 to be screwed into the outer part 2.

So far as the manufacture of the outer part 2 and the positioning of the disc 3 in the cavity 23 are concerned, the invention provides a precise sequence of operations carried out on a precision lathe to ensure that the cylindrical surfaces of revolution 20, 23 and 30 are perfectly coaxial.

A cylinder roughly shaped to dimensions larger than the overall dimensions of the part 2 is fitted onto the lathe with which it remains integral until the turning operations are over.

The first operation comprises boring out the cavities 23 and 24. The disc 3, which is not bored and which has been turned to such a diameter that it can be force-fitted into the cavity 23, is introduced by means of a guide plunger, which may be the plunger 4 before boring of the parts 40 and 41, or a part of identical shape. With the guide plunger remaining in position to hold the disc 3, the orifices 221 are simultaneously bored out in the front surface 21 and 30 in the disc 3, starting from the front surface, after which the front surface 21 and the recess 22 are shaped. Finally, the outer part of the workpiece, especially the part 20, is turned to its final dimensions, after which the outer part may be removed from the lathe for screwthreading the part 201, and, optionally, the part 411.

Positioning of the terminal onto a fibre or bundle in order to end up with the arrangement shown in FIG. 6 is carried out as follows. It is described with reference to the particular case of a bundle 11.

A bundle 11 is first freed from its plastic sheath over a length greater than the useful length and is then degreased by successive soakings is isoamyl acetate and ethylalcohol. It is then introduced into the terminal arranged in the manner shown in FIG. 5, i.e. with the plunger 4 simply resting in the absence of pressure on the disc 3. By virtue of the conical part 410 and the chamfer 300, the sheath-free part enters progressively into the bore 41 of the plunger 4 and then into the orifices 30 and 221 formed respectively in the disc 3 and the front surface 21. When the sheath 10 comes into contact with the conical 410, the front of the bundle projects appreciably beyond the front surface 21 of the terminal.

In a first version of this second embodiment, in which the screwthread 411 does not exist, the successive compression and deformation of the deformable disc 3 takes place at the same time as the crimping operation. Under the action of the flange to be crimped, the element 25 of the outer part is deformed and applies a pressure to the frustoconical part 42 of the plunger. This pressure has a two-fold effect:

the first effect is to cause the plunger 4 to slide frontwards into the cavities 23 and 24 so that, as shown in FIG. 6, it compresses the disc 3, deforms it and forces the orifice 30 tightly to surround the bundle 11;

the second effect, as also shown in FIG. 6, is to deform the frustoconical part 42 (this deformation being facilitated by the four slots, such as 420) and to force the indentations 421 to become wedged in the sheath 10 of the bundle.

This embodiment is valid in cases where, as mentioned above, the diameter of the orifice 30 which is by design equal to the diameter of the orifice 221 does not exceed by more than 10% the diameter of the circle circumscribing the bundle in its compact hexagonal arrangement, which leads to slight deformations of the disc. For example, this embodiment may be used in cases where the orifices 30 and 221 are bored to a diameter of 610 $\mu$m for a bundle of $N = 37$ fibres with a diameter d of 85 $\mu$m; this value of N corresponds to a value of n equal to 4 because:

$$N = 1 + 3n(n-1) = 1 = 3 \times 4 \times 3 = 37$$

which, for the diameter D of the circle circumscribing the bundle in its compact hexagonal arrangement, leads to a value:

$$D = (2n-1)d = 7 \times 85 = 595 \mu m$$

By contrast, the second version of this second embodiment characterised by the existence of the screwthread 411, enables much greater deformation of the disc 3 to be obtained. In this case, the diameter of the orifices 30 and 221 may exceed by 25 to 30% the diameter of the circle-circumsubscribing the bundle in its compact hexagonal arrangement. For example, the second embodiment may be used, still with the orifices 30 and 221 bored to a diameter of 610 $\mu$m, for a bundle of $N = 19$ fibres (i.e. $n = 3$) of diameter $D = 5 \times 85 = 425 \mu m$. In this case, compression of the disc 3 is obtained, after positioning of the bundle and before crimping, by screwing the plunger 4 into the outer part 2 by way of the screwthread 411.

With the bundle of fibres thus held in the terminal under the double effect of the disc 3 and the clamp 42, a drop of a polymerisable resin (for example an epoxy resin derived from bisphenol A and epichlorhydrin or "Araldite") is deposited into the recess 22. After cold polymerization of the resin, the bundle of fibres is divided at the level of the drop. The front surface is then optically polished so that the orifices of the fibres of the bundle and the front surface 21 of the terminal form a common plane having an optical polish.

It is possible to use for the disc 3 a material having a high elastic deformation limit provided that the deformation is perfectly isotropic. Accordingly, polymerized materials such as polytetrafluoroethylene or polyamino-11-undecanoic acid marketed under the respective registered trade marks "Teflon" and "Rilsan", are perfectly suitable. They should be kept permanently compressed, as shown in FIG. 6.

However, it is also possible to use for the disc 3 materials which are deformable in such a way that their elastic deformation limit is exceeded during the compression applied by the plunger. Accordingly, the material is caused to flow and the disc retains a permanent deformation when the plunger 4 ceases the exert its effect. Certain soft metals or alloys, namely indium, lead or tin-lead alloys, satisfy this requirement in their cold state. Certain polymerized materials softened by heat also meet this requirement. It is possible for example to machine the disc in "Teflon" and to obtain compression by heating the terminal for 10 to 15 minutes at a temperature of 100° C. In cases where a disc permanently deformed in this way is used, construction of the terminal may be simplified by leaving out the rear parts 25 of the outer part and 42 of the plunger which are intended for crimping. In this case, the plunger 4 and the sheath 10 are fixed to one another and to the outer part by depositing onto the rear end of the plunger of a varnish (for example a varnish known under the registered trade mark "LOCTIT") which, by penetrating into the interstices between the envelope and plunger and between the plunger and the outer part by capillary action, subsequently holds these three parts together.

When the terminal according to the invention is intended to form part of a connector for directly coupling two identical bundles in the absence of any auxiliary elements, such as a lens or single optical mixing fibre, it is essential for the reasons explained above to provide the terminal with a mark which defines a direction parallel to one of the sides of the hexagon characterising the compact bundle of fibres.

FIGS. 7a and 7b show the modifications which are thus made to the front part of the terminal shown in FIG. 5 to enable the terminal to be marked with a direction characteristic of the compact hexagonal assemblage of fibres of the bundle. FIG. 7a is a section through the front part of the terminal before it is fitted onto the bundle, whilst FIG. 7b is a section taken along a plane perpendicular to the axis AA and marked PP in FIG. 7a.

As shown in FIGS. 7a and 7b, two modifications are made to the terminal shown in FIG. 5.

The first modification comprises replacing, in the disc 3 the cylindrical bore of revolution 30 shown in FIG. 5 by a bore 31 of which the cross-section is in the form of a regular hexagon strictly centred on the axis AA and circumscribing the circle forming the cross-section of the bore 221 in the outer part 2; the apothem $a$ of the hexagon is thus equal to the diameter of the bore 221.

The second modification comprises forming on the outer part 2, between the cylindrical reference surface 20 and the screwthread 201, another cylindrical surface of revolution 230 comprising a flat facet 231 strictly parallel to one of the facets of the regular hexagonal prism forming the bore 31.

During positioning of the bundle of fibres in the terminal and during the subsequent compression of the disc 3 by the plunger 4, the hexagonal bore contracts and orients the hexagonal assemblage of fibres of the bundle parallel to its facets; one of the directions of the hexagonal assemblage is thus parallel to the flat 231. If two terminals conforming to the arrangement shown in FIGS. 7a and 7b are disposed at the ends of two identical bundles assembled by a connector, the flats 231 may thus act as "correctors" so that the two compact assemblages of fibres are assembled end to end, the two hexagons coinciding with one another. Each fibre orifice of a bundle is thus situated in the extension of the other.

In order to obtain the terminal shown in FIGS. 7a and 7b, it is advisable to modify the sequence of manufacturing operations mentioned above in the following manner.

The outer part 2 is turned and the disc 3 is fitted and bored in the same way as described above, except that the front surface 21 and the recess 22 are not shaped so as to obtain a bore 221 of greater depth. It is then removed from the lathe.

Figure 8:
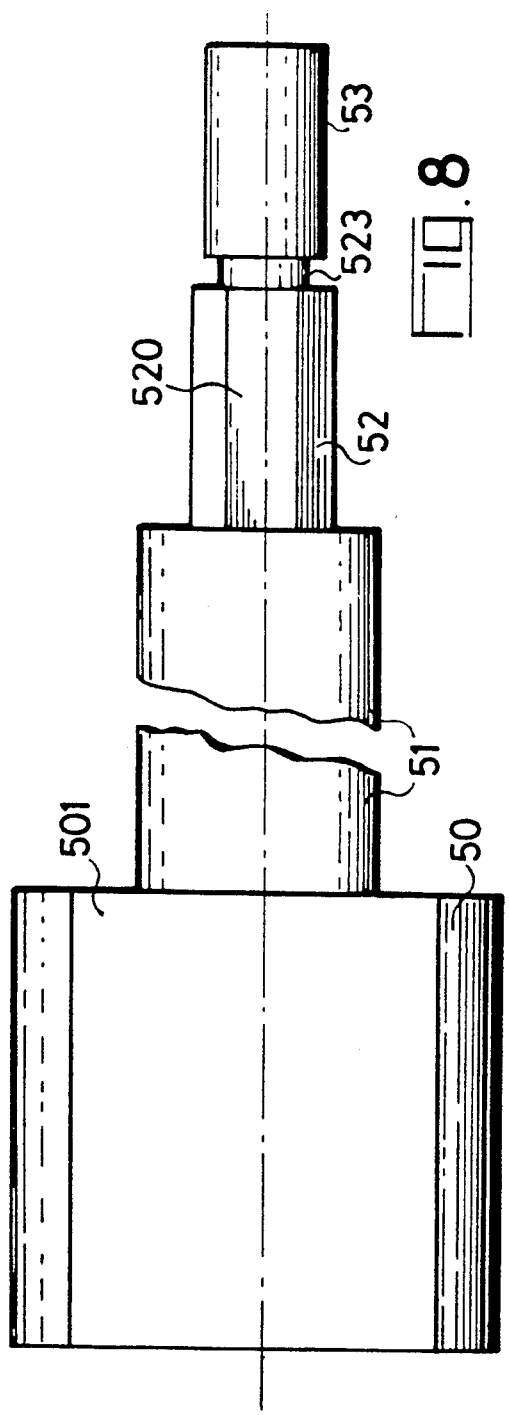
FIG. 8 shows a tool according to the invention intended for the manufacture of the second modified embodiment of the terminal shown in FIGS. 7a and 7b.

In addition, a tool of the type shown in FIG. 8 is made up, comprising at the end of a sleeve 50 a cylindrical part of revolution 51 of which the diameter is such that it slides easily in the cavity 23 of the outer part 2, followed by a regular hexagonal prism 52 with the dimensions of the hexagonal bore 24 to be formed in the disc 3. The tool terminates in a cylindrical surface of revolution 53 machined in such a way as to slide easily in the cavity 221 of the outer part and separated from the prism by a groove 523. The cylinders 51 and 53 and the prism 52 are machined in such a way that they have a common axis. A flat 501 strictly parallel to one of the facets 520 of the hexagonal prism 52 is cut into the sleeve 50.

The tool shown in FIG. 8 is then introduced into the cavity 23 of the outer part 1. The end 53 penetrates successively into the bore 30 of the disc 3 and then into the bore 221 of the front surface. It is thus guided with extreme procision and the prism 52, acting as a punch, cuts the hexagonal bore 31 into the disc 3. The chips formed are forced into the groove 523. With the flat 501 as reference, the outer part is formed with the flat facet 231 which is thus parallel to one of the facets of the hexagonal bore 31 in the disc 3. The outer part 2 is then set up on the lathe again to machine the front surface 21 and the recess 22.

The terminal described above remains useable even when the difference in the diameters of the fibres of the bundle reaches a few percent. The assemblage of fibres thus remains compact and hexagonal to a very considerable extent and the deviation between the axis of the central fibre and the axis of the reference cylinder 20 remains less than 10 $\mu$m.

What we claim is:

1. A positioning terminal for at least one optical fibre provided with a protective sheath, said terminal having an external cylindrical surface of revolution about an axis acting as a positioning reference for said fibre, and comprising:
    an external body having a lateral and a front wall: said external cylindrical surface and an internal cylindrical surface of same said axis bounding at least part of said lateral wall and parallel outer and inner plane faces bounding said front wall;
    a right circular cylindrical internal body force-fitted in said internal cylindrical surface, abutting against said inner face and made of a material with a coefficient of compression by volume substantially greater than that of the constituent material of said external body; and
    a plunger smoothly sliding inside said internal cylindrical surface for bearing on said internal body and thus providing a compressional strain thereof;
    said front wall, said internal body and said plunger respectively defining first, second and third portions of a single bore of same said axis for receiving said optical fibre free of said protective sheath, the cross-sections of said first and second bore portions being greater than that of said fibre;

and said internal body being capable, under said compressional strain, of tightly squeezing said optical fibre in said second bore portion to position it coaxial with said external surface.

2. A terminal as claimed in claim 1, wherein said first bore portion opens into a cylindrical recess, said recess being positioned in the outer face of said front wall to receive a polymerisable material disposed around said optical fibre after insertion thereof into said first, second and third bore portions and into said recess and after compression of said internal body by said plunger.

3. A terminal as claimed in claim 1, wherein said plunger further comprises a fourth cylindrical bore substantially coaxial with said external surface for receiving said optical fibre provided with its protective sheath.

4. A terminal as claimed in claim 3, which further comprises a first deformable part situated on said plunger and a second deformable part situated on said external body at the place occupied by said first deformable part when said plunger is bearing against said internal body, said first and second deformable parts enabling said plunger to be crimped in said outer part during fitting of said terminal onto said optical fibre, indentations being provided in said fourth bore in the vicinity of said first deformable part to engage in said protective sheath during said crimping operation.

5. A terminal as claimed in claim 4, wherein, said first deformable part being frustoconical in shape, the deformation of said second deformable part during said crimping operation displaces said plunger frontwards to cause it to compress said internal body.

6. A terminal as claimed in claim 4, wherein said terminal being arranged at the end of said optical fibre and said protective sheath penetrating into said terminal, said indentations keep said sheath integral with said plunger.

7. A terminal as claimed in claim 1, wherein said optical fibre being a single fibre, said first and second bare portions have the same circular cross-section substantially greater in diameter than said single optical fibre.

8. A terminal as claimed in claim 1, wherein the number N of said optical fibres corresponding to the relation $N = 1 + 3n(n-1)$, where n is an integer at least equal to 2, said first and second bare portions have the same circular cross-section substantially greater in diameter than the value D determined by the relation $D = (2n-1)d$, where $d$ is the diameter of each of said optical fibres.

9. A terminal as claimed in claim 8, said terminal being arranged at the end of a bundle of optical fibres constituted by said N optical fibres, wherein, after compression of said internal body by said plunger, the periphery of said bundle is closely surrounded by said second bare portion, the orifices of said fibres being disposed in the form of a compact substantially hexagonal assemblage and the periphery of said bundle in the vicinity of said orifices being inscribable in a regular hexagon substantially centred on said axis of said external cylindrical surface.

10. A terminal as claimed in claim 9, wherein said internal body has undergone permanent deformation by compression.

11. A terminal as claimed in claim 9, wherein said internal body is kept in a state of elastic deformation by compression by said plunger.

12. A terminal as claimed in claim 1, wherein the number N of said optical fibres corresponding to the relation $N = 1 + 3n(n-1)$, where n is an integer at least equal to 2, said first and second bore portions have cross-sections respectively in the form of a circle and a regular hexagon, the diameter of said circle and the apothem of said regular hexagon being equal and substantially greater than the value D determined by the relation $D = (2n-1)d$, where d is the diameter of each of said optical fibres, said external body then comprising, on its outer periphery, a flat facet parallel to said axis and to one side of said hexagon.

13. A terminal as claimed in claim 1, further comprising means for causing said plunger to compress said internal body.

14. A terminal as claimed in claim 13, wherein said means are formed by an outer screwthread on said plunger and an inner screwthread in said internal cylindrical surface opposite said front wall, said outer screwthread and said inner screwthread enabling said plunger to be screwed into said external body.

15. A method of manufacturing a positioning terminal for at least one optical fibre provided with a protective sheath, said terminal having an external cylindrical surface of revolution about an axis acting as positioning reference for said fibre and comprising:

an external body having a lateral and a front wall; said external cylindrical surface and an internal cylindrical surface of same said axis bounding at least part of said lateral wall and parallel outer and inner plane faces bounding said front wall;

a right circular cylindrical internal body forcefitted in said internal cylindrical surface, abutting against said inner face and made of a material with a coefficient of compression by volume substantially greater than that of the constitutent material of said external body; and a plunger smoothly sliding inside said internal cylindrical surface for bearing on said internal body and thus providing a compressional strain thereof;

said front wall, said internal body and said plunger respectively defining first, second and third portions of a single bore of same said axis for receiving said optical fibre free of said protective sheath, the cross-sections of said first and second bore portions being greater than that of said fibre;

said internal body being capable, under said compressional strain, of tightly squeezing said optical fibre in said second bore portion to position it coaxial with said external surface, said first bore portion opening into a recess, said recess being positioned in the outer face of said front wall to receive a polymerisable material disposed around said optical fibre after insertion thereof into said first, second and third bore portions and into said recess and after compression of said internal body by said plunger;

said method comprising the following steps:
(a) lathe-turning a blank of said external body, said blank terminating in said flat front surface provided with said recess and being laterally defined by a cylindrical surface of circular cross-section larger in diameter than said outer surface;
(b) forming in said blank said internal cylindrical surface;
(c) force-fitting said internal body within said internal cylindrical surface;

(d) boring said first and second bore portions in said front surface and said internal body, respectively;

(e) lathe-turning said external surface in at least part of said cylindrical surface;

steps (d) and (e) at least being carried out on the same lathe without releasing said blank from the clamping jaws of said lathe.

16. A method as claimed in claim 15, wherein step (b) is also carried out on said lathe, said blank remaining integral with said lathe at least from the beginning of step (b) to the end of step (e).

17. A method of manufacturing a positioning terminal for a bundle of N optical fibres provided with a protective sheath, where N is given by the relation $N = 1 + 3n(n-1)$, with n being an integer at least equal to 2, said terminal having an external cylindrical surface of revolution about an axis acting as a positioning reference for said bundle and comprising:

an external body having a lateral and a front wall; said external cylindrical surface and an internal cylindrical surface of same said axis bounding at least part of said lateral wall and parallel outer and inner plane faces bounding said front wall;

a right circular cylindrical internal body forcefitted in said internal cylindrical surface, abutting against said inner face and made of a material with a coefficient of compression by volume substantially greater than that of the constituent material of said external body; and a plunger smoothly sliding inside said internal cylindrical surface for bearing on said internal body and thus providing a compressional strain thereof;

said front wall, said internal body and said plunger respectively defining first, second and third portions of a single bore of same said axis for receiving said bundle of optical fibres free of said protective sheath, the cross-sections of said first and second bore portions being greater than that of said bundle;

said internal body being capable, under said compressional strain, of tightly squeezing said bundle in said second bore portion to position it coaxial with said external surface; said first bore portion opening into a recess, said recess being positioned in the outer face of said front wall to receive a polymerisable material disposed around said bundle after insertion thereof into said first, second and third bore portions and into said recess and after compression of said internal body by said plunger;

said first and second bore portions having cross-sections respectively in the form of a circle and a regular hexagon, the diameter of said circle and the apothem of said regular hexagon being equal and substantially greater than the value D determined by the relation $D = (2n-1)d$, where d is the diameter of each of said optical fibres, said external body then comprising, on its outer periphery, a flat facet parallel to said axis and to one side of said hexagon;

said method comprising the following steps:

(a) lathe-turning a blank of said external body, said blank terminating in said front flat surface provided with said recess and being laterally defined by a cylindrical blank surface of circular cross section larger in diameter than said external surface;

(b) boring said blank to form said internal cylindrical surface;

(c) force-fitting said internal body within said internal cylindrical surface;

(d) boring in said front surface and said internal body respectively a first and a second cylindrical opening of circular cross-section, equal in diameter and substantially coaxial with said cylindrical blank surface;

(e) lathe-turning said external cylindrical surface in at least part of said cylindrical blank surface, said external surface being coaxial with said first and second openings;

(f) forming said second cylindrical opening of circular cross-section to obtain said second bore portion with a regular hexagonal cross-section and the same axis;

(g) cutting said flat facet into said external cylindrical surface, steps (d) and (e) at least being carried out on the same lathe without removing said blank from the clamping jaws of said lathe; and step (f) being carried out by means of a punch introduced into said opening; said punch comprising, from the front to the rear, a first cylinder of revolution sliding easily in said first opening, a prism with a cross section in the form of a regular hexagon, a second cylinder of revolution sliding smoothly in said cylindrical hole and a sleeve comprising a flat surface parallel to one of the sides of said hexagonal cross-section, said first and second cylinders and said prism being coaxial and said flat surface serving as reference during step g) for the cutting of said facet.

18. A method of fixing to at least one optical fibre a positioning terminal for at least one optical fibre provided with a protective sheath, said terminal having an external cylindrical surface of revolution about an axis acting as positioning reference for said fibre and comprising:

an external body having a lateral and a front wall; said external cylindrical surface and an internal cylindrical surface of same said axis bounding at least part of said lateral wall and parallel outer and inner plane faces bounding said front wall;

a right circular cylindrical internal body force-fitted in said internal cylindrical surface, abutting against said inner face and made of a material with a coefficient of compression by volume substantially greater than that of the constituent material of said external body; and a plunger smoothly sliding inside said internal cylindrical surface for bearing on said internal body and thus providing a compressional strain thereof;

said front wall, said internal body and said plunger respectively defining first, second and third portions of a single bore of same said axis for receiving said optical fibre free of said protective sheath, the cross-sections of said first and second bore portions being greater than that of said fibre;

said internal body being capable, under said compressional strain, of tightly squeezing said optical fibre in said second bore portion to position it coaxial with said external surface; said first bore portion opening into a recess, said recess being positioned in the outer face of said front wall to receive a polymerisable material disposed around said optical fibre after insertion thereof into said first, second and third bore portions and into said recess and after compression of said internal body by said plunger;

said method comprising the following steps:
  (a) baring the end of said fibre to obtain one fibre end free of said protective sheath;
  (b) introducing said plunger inside said internal cylindrical surface;
  (c) introducing said sheath-free end of the fibre into said first, second and third bore portions and into said recess until the end of said bare fibre projects beyond said front surface;
  (d) compressing said internal body by said plunger;
  (e) depositing said polymerisable material into said recess and polymerising said material to obtain a polymerised material;
  (f) cutting off the end of said fibre projecting beyond said polymerised material and optically polishing said front wall, said polymerised material and the orifice of said fibre.

* * * * *